March 11, 1952   F. O. KOMPASS   2,588,851
TOASTER

Filed Oct. 31, 1946   5 Sheets-Sheet 1

INVENTOR
Frank O. Kompass
BY A. H. Golden
ATTORNEY

March 11, 1952  F. O. KOMPASS  2,588,851
TOASTER

Filed Oct. 31, 1946  5 Sheets-Sheet 3

Fig. 5.

INVENTOR
Frank O. Kompass
BY
ATTORNEY

March 11, 1952  F. O. KOMPASS  2,588,851
TOASTER
Filed Oct. 31, 1946  5 Sheets-Sheet 4

INVENTOR
Frank O. Kompass
BY
A. H. Golden
ATTORNEY

Patented Mar. 11, 1952

2,588,851

UNITED STATES PATENT OFFICE 2,588,851

TOASTER

Frank O. Kompass, New York, N. Y., assignor to The Yale & Towne Manufacturing Company, Stamford, Conn., a corporation of Connecticut Application October 31, 1946, Serial No. 706,975

26 Claims. (Cl. 99—386)

This invention relates to a toaster, and more particularly to that type of toaster in which slices of bread or the like are propelled through a passage at each side of which may be located toasting heating elements. In one type of toaster of the particular class, the slices of bread to be toasted are maintained in continuous contact with a conveyor that may be formed in various ways, the conveyor moving the bread past the toasting elements.

In another type of toaster of the class described, the slices of bread rest on a support between toasting elements, and are periodically lifted, moved a short distance, and then dropped on the support again. In each of the two conveyor type toasters described, the bread is not fed positively through the toaster, and may jam or otherwise be halted in its movement past the heating elements. It is also difficult in toasters of the particular class, to handle different thicknesses and sizes of bread and to adjust the toasting speed. For this reason, toasters of the particular class have never achieved great commercial success, as those skilled in the art fully appreciate.

It is the object of my invention to contribute to the art a conveyor type toaster in which the varying sizes and types of bread may be moved step by step past toasting heating elements, with movement imparted to the bread by positive means that actually "grab" the bread and move it step by step through the toaster at a controlled speed.

As a feature of my invention, I utilize cyclic moving means for contacting the toast, moving the toast a short distance past the toasting elements, and then moving away from the toast and back to the starting point of the cycle. As a further feature of this part of the invention, the toast is preferably formed by moving the slices of bread relatively to a support with the toasting heating elements at each side of the support and between the bread and the toasting heating elements.

As a still further feature of my invention, I utilize traction means, as I call the means that contact the bread for moving it through the toaster, adapted to be moved through lost motion means against the slices of bread. In this way, my toaster is adapted to co-act equally well with slices of different thicknesses, the lost motion means being effective for the particular purpose. As a still further feature of the invention, I utilize lost motion means for moving the traction means through that part of each cycle during which the traction means are moved with relation to the linear movement of the bread through the machine. By limiting the movement of the traction means through the said lost motion means, I am able to control the distance that the traction means are effective to move the slices of bread in each cycle, thereby determining the speed of movement of the bread past the toasting heating elements. This is an exceedingly important feature of my invention.

A still further feature of the invention resides in the manner in which the traction means are mounted and utilized, and whereby they are adapted to be moved, while sealing the power means through which they are moved, from crumbs and other debris that results from the toasting operation.

Still a further feature of the invention resides in the arrangement of guide means for the toast so that as the slices are moved by the traction means, the toast will be stripped from the traction means during each cycle, thereby compelling the bread to move longitudinally through the machine rather than cyclically with the traction means in a closed path.

A still further feature of the invention resides in the means utilized to hold the toast in particular relation to the toaster as it is delivered from the toaster.

Still a further feature of my invention resides in the form of the traction means whereby they are readily adjusted for thick and thin slices of bread and for moving thick and thin slices simultaneously.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims to be granted me shall be of sufficient breadth to prevent the appropriation of my invention by those skilled in the art.

Referring now to the drawings.

Referring now more particularly to the drawings, reference numeral 10 indicates a casing formed of sheet metal and adapted to cover the structural frame of my toaster designated generally by reference numerals 11 applied in various positions to the drawings. The frame 11 is formed of a series of structural metal parts held together by screws or spot welding and includes as its basic main portion a base plate 12 best shown in Figs. 6 and 8, and it is this base plate 12 that supports generally the elements of my invention.

Figure 1:
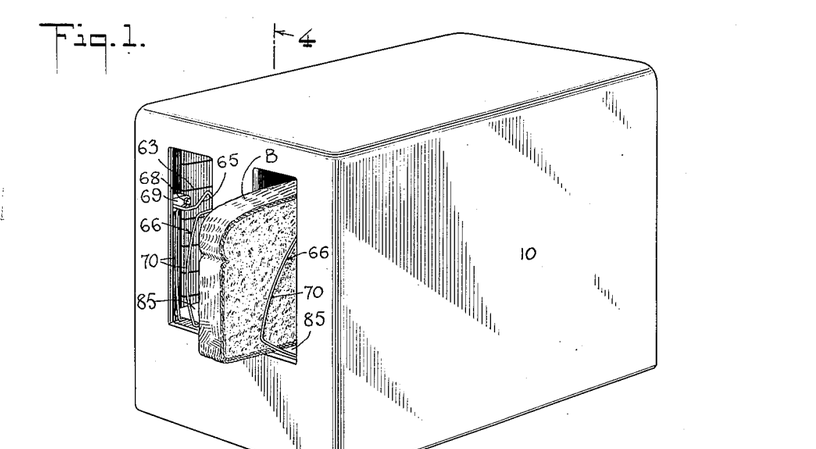
Fig. 1 is a perspective view of a toaster in which my invention is embodied.
Figures 2, 3:
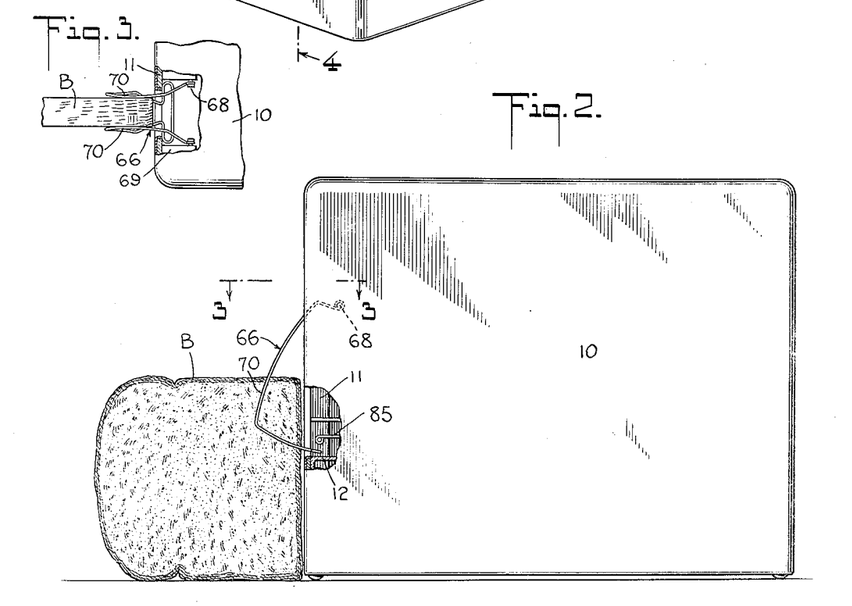
Fig. 2 is a side elevation of the toaster of Fig. 1.
Fig. 3 is a section taken along lines 3—3 of Fig. 2.
Figure 4:
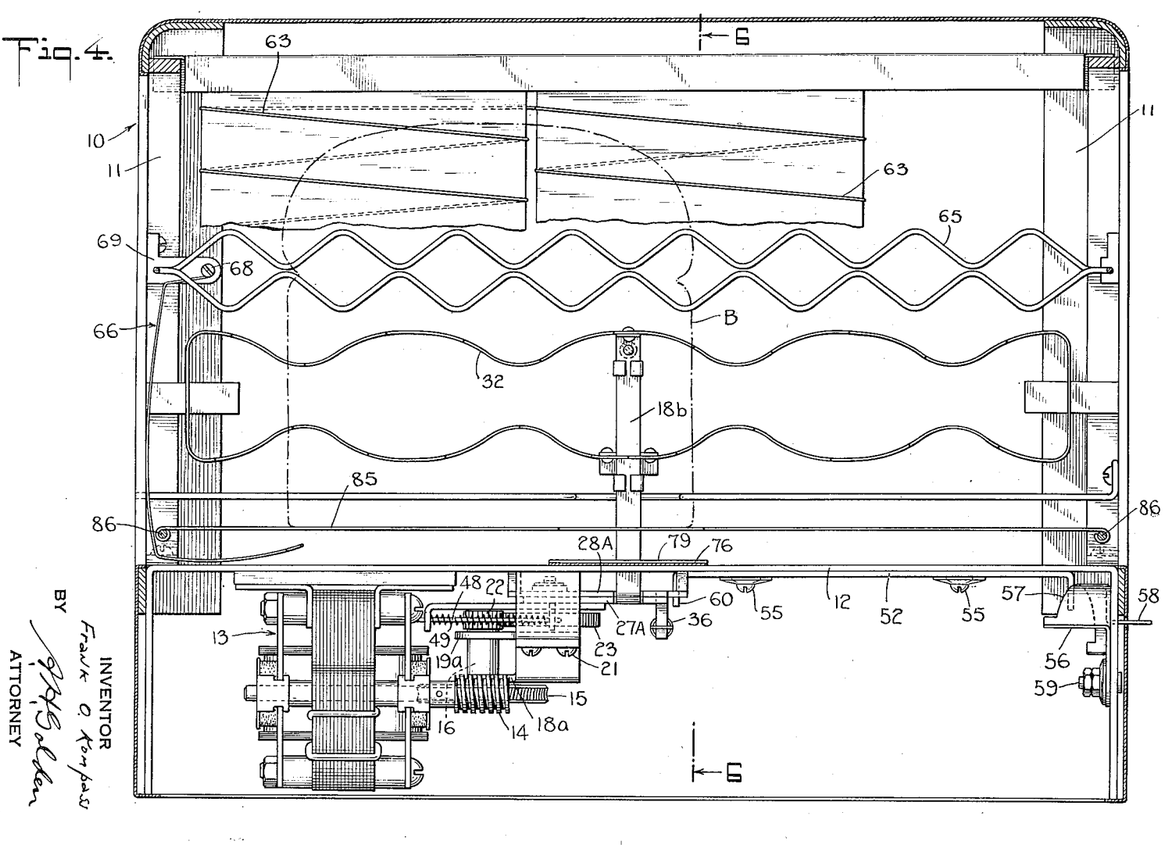
Fig. 4 is a vertical longitudinal section of the toaster taken substantially along lines 4—4 of Fig. 1.

As best seen in Fig. 4, there is secured to the base plate 12 an electric motor designated generally by reference numeral 13, this motor driving a worm 14 that in turn drives a gear 15. The gear 15 is secured to shaft 16 best seen in Figs. 4, 7, and 12, the shaft 16 being supported by an ear 18a of a bearing member 18 and an ear 19a of a bearing member 19. As best seen in Fig. 8, bearing member 19 is formed of sheet metal bent up and secured by screws 20 to the base plate 12. Bearing member 18 is bent up and secured by screws 21 to the bearing member 19. It may be well at this point to indicate that the fabrication of my invention is not an important phase thereof, and will not be stressed in this specification. I have actually erected toasters in accordance with the drawings of this application and these toasters have operated very satisfactorily. Those skilled in the art will understand, however, that I may choose to fabricate my toaster in many different ways, depending on conditions and fabricating processes developed by industry.

Figure 7:
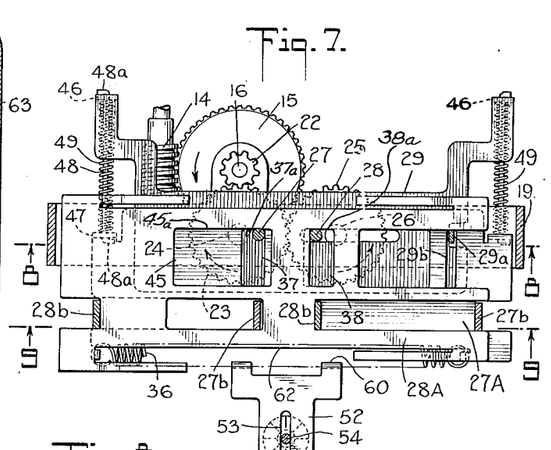
Fig. 7 is a section taken along lines 7—7 of Fig. 6.
Figures 8, 9:
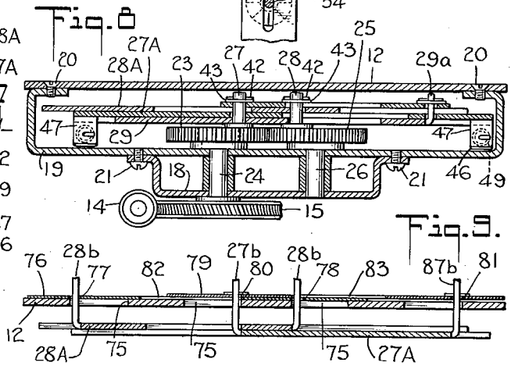
Figs. 8 and 9 are sections taken respectively along lines 8—8 and 9—9 of Fig. 7.
Figure 12:
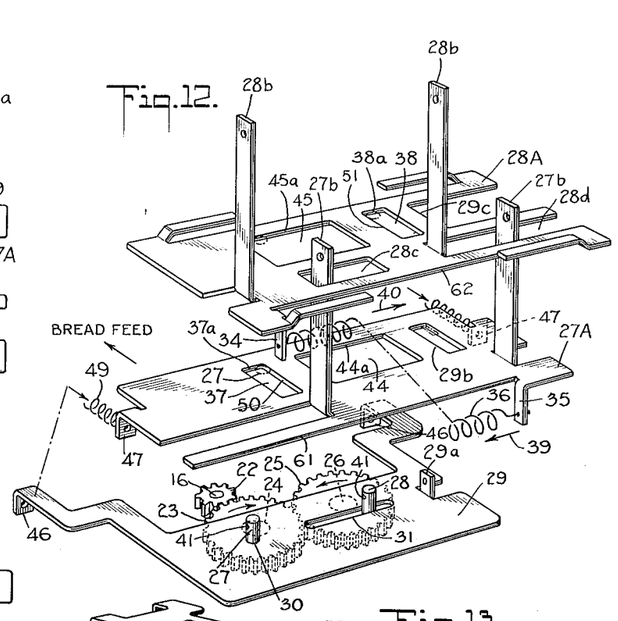
Fig. 12 is a perspective view of the two feed plates and the control plate of my invention.

Secured to the upper end of the shaft 16, as best seen in Figs. 4, 7, and 12, is a pinion 22, this pinion being in driving engagement with a gear 23 that is secured to a shaft 24 supported by the bearing plates 18 and 19 as best seen in Fig. 8. Gear 23 is in engagement with a gear 25 formed as a duplicate of gear 23 and mounted on a shaft 26 supported in the same manner as is the shaft 24 by the bearing plates 18 and 19. A cam pin 27 is secured to gear 23 and a similar cam pin 28 is secured to gear 25. These cam pins are fixed to the gears in such relation that the axes thereof always lie in parallel vertical planes, as is quite apparent from the drawings.

A control plate utilized as an important part of my invention is designated by reference numeral 29, and is best shown in Fig. 12. This control plate is formed with a bore 30 through which extends pin 27. It is formed with a slot 31 through which extends pin 28. As the pins 27 and 28 rotate on the axes of shafts 24 and 26, the plate 29 will have imparted thereto a rotating motion. However, at all times the control plate 29 will lie with its edge surfaces parallel to the position illustrated in Fig. 12.

Resting on top of control plate 29 is a feed plate 27A, and in turn superimposed on feed plate 27A is feed plate 28A. Feed plate 27A has been so numbered because it is adapted to have movement imparted thereto by pin 27, while feed plate 28A has been so called because movement is imparted thereto by pin 28. It will be noted that from the feed plate 28A there extends upwardly a pair of arms 28b formed integrally therewith. Extending upwardly from the plate 27A are arms 27b. Each of the arms 27b, 28b is adapted to have secured thereto by suitable means illustrated in Figs. 4 and 6, a traction element 32 formed from a strip of metal and shaped in the form seen in the drawings. Moreover, each of the traction elements 32 has a plurality of teeth 33 to facilitate its feeding of the slices of bread. As will appear more clearly hereinafter, arms 27b are adapted to approach cyclically the arms 28b so as to bring the traction elements 32 toward one another and against the opposed surfaces of the slices of bread B, seen best in Fig. 5. Thereafter, linear movement is imparted to the bread by the traction elements 32 through movement of the plates 27A and 28A, after which the plates are so moved as to move the traction elements 32 away from the bread, following which the traction elements are moved to the beginning of the cyclic path. The functioning of this portion of the invention has thus been described generally in order that it be easier to understand the operation of the parts now to be set forth.

Plate 28A has a downwardly extending lug 34 while plate 27A has a downwardly extending lug 35, and between the two lugs there is positioned a spring 36 that tends to move the plates toward one another. When the plates are placed in superimposed relation to one another and to the control plate 29, the pin 27 enters a cam slot 37 in plate 27A, while pin 28 enters a cam slot 38 in plate 28A. It is obvious that the spring 36 tends to press the plate 27A in the direction of the arrow 39 to bring a surface 50 of the slot 37 against the pin 27 and to press the plate 28A in the direction of arrow 40 to bring a surface 51 of the slot 38 against the pin 28. The pins 27 and 28 are formed with small holes 41 to accommodate pins 42 as best seen in Fig. 8 for holding washers 43 in retaining position, thereby maintaining assembled the two feed plates 27A, 28A relatively to the control plate 29. It will be noted further that plate 27A is formed with a slot 44 to allow free movement relatively thereto of the pin 28, while the plate 28A is formed with a slot 45 to allow free movement relatively thereto of the pin 27. However, the surface 45a of the slot 45 and the surface 44a of the slot 44 will be positioned in the same vertical plane at all times as the corresponding ends of the slots 37 and 38 so that effective linear movement in a feed direction may be imparted to the feed plates 28A and 27A. This feed direction is denoted by the arrow in Fig. 12 identified by the words "Bread Feed."

The control plate 29 is formed with a pair of downwardly positioned ears 46 adapted for alignment with a pair of downwardly positioned ears 47 of the lower feed plate 27A. A spring guiding pin 48, best seen in Figs. 7, 10, and 11 lies between each pair of ears 46, 47 and is retained relatively to said ears by bent portions 48a thereof. A spring 49 rests about each pin 48 and between the ears 46, 47, tending to maintain the feed plate 27A pressed in a non-feeding direction relatively to the control plate 29. The arrangement of the two feed plates 27A, 28A is such that they move together in a bread feeding and in a non-feeding direction so that the springs 49 will wardly depending lugs 60 will prevent further movement of the feed plates 27A, 28A in a non-feed direction from Fig. 7 to just before the position of Fig. 10, so that the springs 49 will merely be compressed while the control plate 29 is moved positively in a non-feed direction by pins 27 and 28 from the position of Fig. 14 to a position just in advance of Fig. 10.

During the bread feeding movement described earlier with reference to Fig. 11, the feed plates 27A, 28A will receive less than full motion if their retractive movement by control plate 29 was not sufficient to bring them to the beginning point of the feed cycle. In other words, the feed plates 27A, 28A are moved positively to feed the bread, and are merely moved through the springs 49 to bring the feed plates to the beginning of each feed cycle. If the feed plates are prevented from movement to the beginning of each feed cycle, as by the lever 52 and its depending lugs 60, then the said feed plates 27A, 28A cannot contribute full feed movement to the slices of bread. Therefore, it is possible to regulate the toasting operation by merely slowing down the movement of the bread in the toaster through the shortening of each bread feed step of each cycle. To lengthen each bread feed step of each cycle, it is only necessary to rotate cam 56 to bring a narrow portion of cam surface 57 opposite lever 52. The feed plates 27A, 28A will then move freely, sliding the lever 52 until it encounters the cam surface 57.

In order to guide and control the directional alignment of plates 27A, 28A the control plate 29 is formed with a lip 29a that lies in a guide slot 29b of plate 27A. Plate 28A has a surface 29c that is pressed against the lip 29a through the pressure of spring 36. These parts merely aid the parts described earlier and have been found helpful by me.

Figure 5:
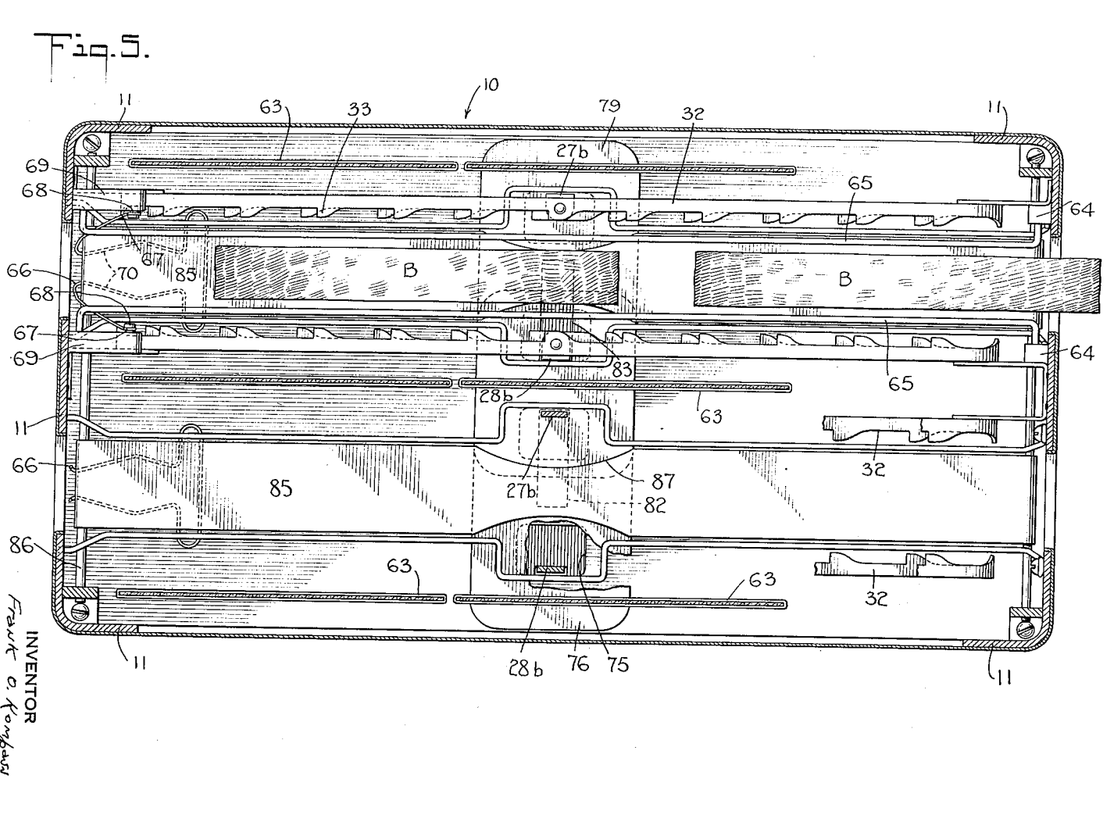
Fig. 5 is a horizontal section of the toaster and a partial section and plan view thereof.
Figure 6:
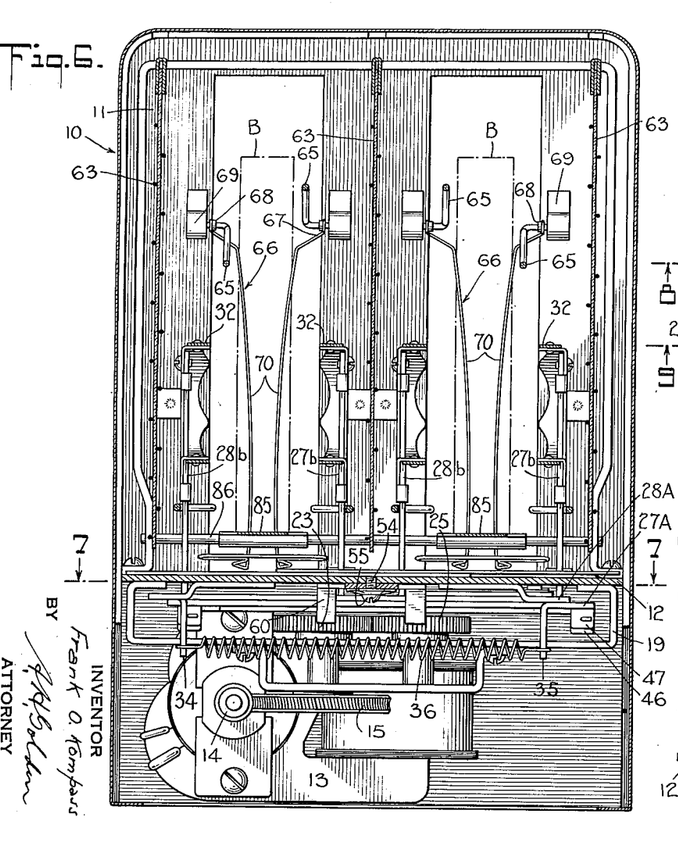
Fig. 6 is a vertical transverse section taken along lines 6—6 of Fig. 4.

Referring now to Figs. 4 and 6, the heating elements of my toaster are designated by reference numerals 63, being formed of suitable wire wound about mica plates, as is standard in this art. At each end of the main frame 11 of the toaster, there are threaded screws 64, and these screws hold in place guide wires 65 that are bent as best illustrated in Fig. 4. The purpose of bending the wires 65 as illustrated, is not only to better guide the slices of bread B, but also to prevent the forming of untoasted lines on the bread, as would be the case where the wires 65 merely to stretch horizontally across the toaster. For the same reason, and also to obtain better traction of the toast through the toaster, I use the form of traction element 32 that is best illustrated in Fig. 4. Through reference to Fig. 5, it will be noted that the two upper traction elements 32 there illustrated are adapted to be withdrawn beyond opposed sides of the upper two guide wires 65. Because of this arrangement, the bread slices B cannot follow the traction elements 32, but must be stripped therefrom. This makes it impossible for the bread to adhere to the traction elements 32 and to move therewith. Instead the bread will cyclically be stripped from the traction elements and allowed to remain stationary until the traction elements once again contact the toast and advance it through the machine. This is an extremely important part of my invention.

It will be noted best from Figs. 4 and 5 that each of the traction elements 32 is secured at its center to one of the arms 27b, 28b. The arms 27b, 28b are relatively thin and are adapted to yield somewhat due to the leverage exerted by the traction elements upon tendency of the traction elements to rotate on the vertical axes of arms 27b, 28b. It is possible also to secure the same result by utilizing a yielding support for the traction elements on arms 27b, 28b. Because of this relationship of the parts, should a thick slice of bread be inserted in the machine, and thereafter a thin slice of bread inserted, the thick slice will tend to press apart the ends of the opposed traction elements 32 when those elements contact it. This will cause the traction elements 32 to rotate on the axes of arms 27b, 28b so as to effect a movement of the other ends of the traction elements against the relatively thin slice. Reversely, should a thin slice be first inserted, the traction elements will keep moving against the thin slice. Thereafter, if a thick slice is inserted, the thick slice will separate the traction elements at its end of contact with the said traction elements, causing the opposed ends of the traction elements to approach one another for contacting fully the thin slice. This is also an extremely important part of my invention.

It is frequently desirable to prevent the uncontrolled movement of the finished toast away from the toaster as it leaves the toaster. I provide rather novel and interesting means for preventing this uncontrolled movement of the toast. Thus, I utilize a single piece of wire designated generally by reference numeral 66, bent as best illustrated in Figs. 1, 2, 3, and 5. Ends 67 of the wire 66 mount the wire for swinging rotation about studs 68 secured to brackets 69 forming a part of the frame 11 of the toaster. The wire 66 is so formed that through gravity it tends to remain in its position illustrated in Figs. 1 and 5. As a piece of bread moves to the left in Fig. 5, it enters between the arms 70 of the wire 66. Thereafter, the bread gradually rotates the wire 66 from the position of Fig. 5 to the position of Fig. 1 and then toward the position of Fig. 2. When the movement of the bread brings it into the overbalanced position of Fig. 2, it merely rotates downwardly from its position of Fig. 1 into the position of Fig. 2, where it is held. As soon as the bread B is removed from its position of Fig. 2, the wire 66 rotates on studs 68 back to its position of Fig. 1 ready for the next slice. While I prefer to use the wire illustrated, it is possible to use gates, flippers, or other means for the same purpose. It will be interesting to note that my machine can utilize the holding means for the bread, as outlined, because I employ a positive feed for the bread capable of moving the bread into co-action with the wire 66.

The base plate 12 of the machine, as best illustrated in Figs. 5 and 9 is formed with a series of openings 75, one for each arm 27b, 28b. If these openings were allowed to remain open, crumbs would tend to drop downwardly into the operating mechanism, as those skilled in the art will appreciate. In order to prevent such movement of crumbs and other debris, a cover plate 76 slotted at 77 and 78 is secured over the two arms 28b. A similar plate 79 is slotted at 80 and 81 and is secured over the arms 27b. Plate 76 will, of course, move with the arms 28b and plate 79 will move with the arms 27b. The two plates are extremely thin so that any matter resisting their movement will operate against a very sharp edge and therefore will be subject to great shearing stress. In this way, very little resistance to the movement of the arms 27b, 28b is contributed by the plates 76 and 79. Therefore, the plates, while effective to pretherefore be effective on both plates, all as will be quite apparent. It may be well to indicate that the plates do move together in a bread feeding and in a non-feeding direction through the maintenance of the vertical arms 27b of plate 27A in lateral slots 28c and 28d of the feed plate 28A. I should now like to describe the cyclic action of the feed plates 27A, 28A and the traction elements 32 secured thereto, whereby the traction elements move against the slices of bread, then move the slices of bread longitudinally in a bread feeding direction, and then away from the bread and back to the beginning of the cycle.

Referring first to Fig. 7, we note there that the pin 27 is just beginning to move toward the left while moving clockwise and downwardly, while the pin 28 is just beginning to move to the right while moving counter-clockwise and downwardly. As a matter of fact, pin 27 is as far to the right as it can go while pin 28 is as far to the left as it can go. Movement of plates 27A, 28A downwardly is prevented by surfaces 37a, 45a of slots 37 and 45 impinging against pin 27, and by surfaces 44a and 38a of slots 44, 38 impinging against pin 28. Since pin 27 is as far to the right as it can go, it is holding the plate 27A as far to the right as the said plate can move in Figs. 7 and 12. Therefore, arms 27b will hold their respective traction elements 32 as far away from the bread slices as it is possible to move the said traction elements. Similarly, the pin 28 will hold the plate 28A as far to the left in Figs. 7 and 12 as is possible, and therefore the arms 28b will hold their respective traction elements 32 also as far away from the bread as it is possible to maintain them.

Figures 10, 11:
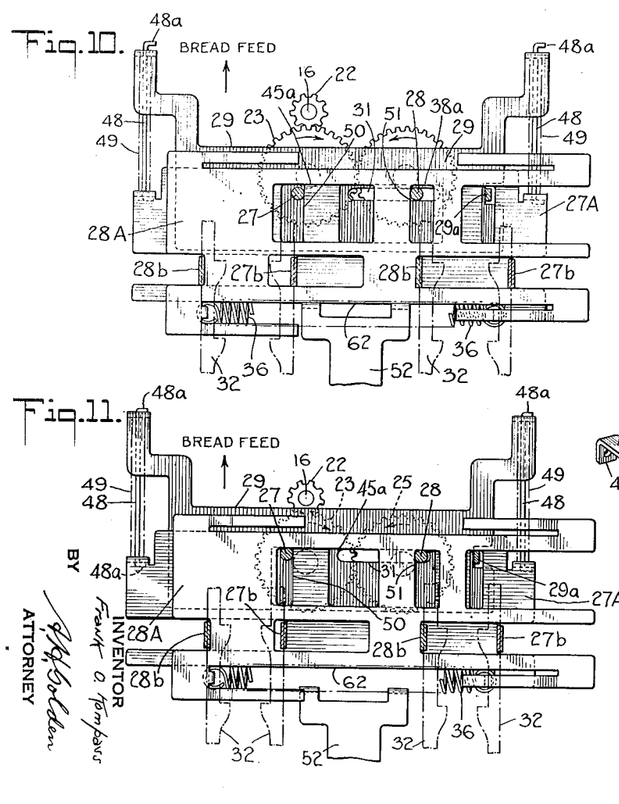
Figs. 10 and 11 are views of the parts of Fig. 7 in different positions.

Let us see now what happens when the pins 27 and 28 move to the position of Fig. 10. It will now be noted that under the influence of the spring 36, the plate 27A has moved to the left somewhat while the plate 28A has moved to the right, all under the control of the pins 27 and 28. In this position of the parts, if a piece of bread is encountered by the traction elements 32, the bread will tend to hold the traction elements against moving further under the influence of the spring 36. Therefore, with the parts in the position of Fig. 10, should the pin 27 move further to the left through further clockwise movement thereof, the said pin will leave the edge 50 of the slot 37. Actually the amount of movement that the pin 27 may have relatively to the plate 27A is equal the difference between the diameter of the pin 27 and the width of the slot 37. In other words, the mechanism is adapted to adjust itself automatically to different thicknesses of bread with the total thickness variation of each traction element 32 equal to the distance between the diameter of pin 27 and the width of slot 37.

While the pin 27 is moved to the left during its clockwise movement to the position of Fig. 10, the pin 28 is simultaneously moved to the right through its counter-clockwise rotation from Fig. 7. If the slice of bread is so thick as to prevent the feed plate 28A following the movement of pin 28 through the force of spring 36, then the pin 28 will leave the surface 51 of the slot 38 in the same manner that the pin 27 was described as leaving the surface 50 of the slot 37. I believe that the manner in which my toaster compensates for varying thicknesses of bread will now be clearly understood. It should be noted that in Fig. 10 the surfaces 38a, 45a of slots 38 and 45 have left pins 28 and 27. This is also true with regard to surfaces 37a, 44a of slots 37, 44 of plate 27A. This will be explained below.

Referring now to Fig. 11, we see that the pin 27 has moved somewhat beyond its full left position while the pin 28 has moved somewhat beyond its full right position. Assuming that the bread has been very thin, and that the spring 36 has functioned to move the plates 27A, 28A fully to follow pins 27, 28, it will be noted that the arms 27b, 28b have moved fully against the bread. As shown in phantom in Fig. 11 through dash and dotted lines, the traction elements 32 have moved to their extreme bread contacting position and are considerably closer than in Fig. 10. With the parts in the position of Fig. 11, the pins 27 and 28 are functioning to move the feed plates 27A, 28A linearly in a bread feeding direction denoted by the "Bread feed" arrows in Figs. 11 and 12. This movement is imparted to the feed plates 27A, 28A through contact of the pins 27 and 28 with the extreme end surfaces 37a, 38a of the slots 37 and 38 as well as surfaces 44a and 45a of slots 44 and 45. It will be noted further that this movement in a bread feed direction is positive and that the power is contributed directly by the electric motor through pins 27, 28.

Figures 13, 14:
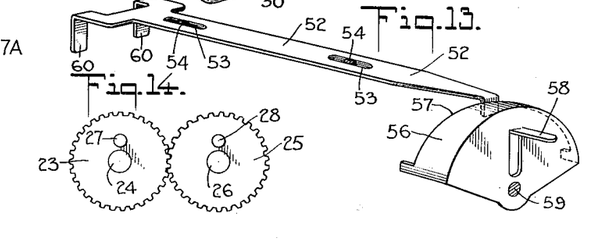
Fig. 13 is a perspective view of the speed control mechanism.
Fig. 14 is a view of the gears carrying the cam pins in one position thereof.

As soon as the pins 27 and 28 reach the position of Fig. 14, we will have reached the end of the bread feed movement. The pins 27 and 28 will now press respectively against the surfaces 50 and 51 of the plates 27A, 28A to move the said plates positively toward the position of Fig. 7, in which position the plates are in their extreme separated positions and with the traction elements 32 as widely separated as it is possible to place them. Thereafter, we complete the movement of the control plate 29 in a direction opposed to its bread feeding directional movement. During this movement of the control plate 29, corresponding to its movement from the position of Fig. 7 to a position just in advance of that shown in Fig. 10, the said feed plates 27A and 28A may or may not move with the control plate 29, depending on what speed of movement of the toast is desired. If it is desired that each step in a bread feeding direction be the fullest that may be imparted by the feed plates 27A, 28A, then the feed plates 27A, 28A will be allowed to move fully under the influence of the control plate 29, all as will now be made apparent.

Movement in a non-feed direction will be imparted by the control plate 29 to the feed plates 27A, 28A through the intermediary of the springs 49 as already set forth. If it is desired to shorten each bread feeding step, then a speed control lever 52 is utilized. This speed control lever 52 is formed with a pair of slots 53 traversed by the shafts 54 of screw studs 55 that are threaded into the base plate 12 and function to maintain the speed control lever 52 against the said base plate and for sliding movement relatively thereto. Sliding movement is imparted to the speed control lever 52 by a rotating cam 56 having a tapering cam surface 57 and a manually operated arm 58 extending outwardly of the toaster casing 10 at one end thereof. It is obvious that by rotating the cam 56 clockwise in Fig. 13 about its mounting shaft 59 the surface 57 thereof will be adapted to slide the lever 52 longitudinally relatively to the base plate 12 on its bearing shafts 54. This movement may bring the depending lugs 60 of the lever 52 against the edge 61 of the feed plate 27A and the edge 62 of the feed plate 28A as best seen in Fig. 10. Naturally, the downvent any movement of debris through the openings 75, do not hinder the movement of the operating mechanism. It is important to note that while the said plates 76, 79 cover at all times the slots 75, they must themselves be equipped with slots 82 and 83 in order to allow relative sliding action between the arms 27b, 28b and the plates 27A and 28A. Their action is such that slots 82, 83 are always out of alignment with openings 75 when openings 75 are exposed.

For supporting the bread B in its passage through the toaster, I use a sheet metal strip 85 located between the heating elements and above plate 12 as best seen in Figs. 4, 5, and 6, there being of course two such strips. Each strip is supported at each end by a rod 86 extending transversely of the toaster as best seen in Figs. 5 and 6. To allow full movement of the arms 27b, 28b, each strip 85 is cut away at 87 as best seen in Fig. 5.

I believe that the nature of my invention and its operation will now be understood by those skilled in the art.

I now claim:

1. In a toaster of the class described, a pair of spaced toasting elements, a support on which a slice of bread may rest as it is moved between said pair of toasting elements, traction means for said bread at each side of said support, and power means for actuating said traction means cyclically to contact the bread, move the bread relatively to said support and then leave the bread.

2. In a toaster of the class described, a pair of spaced toasting elements, a support on which a slice of bread may rest as it is moved between said pair of toasting elements, a unitary traction means for said bread at each side of said support, power means for actuating said traction means cyclically to contact the said slice of bread, move the said bread relatively to said support while in contact therewith and then leave the bread, and means for stripping said traction means from said bread as said traction means moves to leave the bread.

3. In a toaster of the class described, a pair of spaced toasting elements, a support on which a slice of bread may rest as it is moved between said pair of toasting elements, traction means for said bread at each side of said support, power means for actuating said traction means cyclically to contact the bread, move the bread on said support and then leave the bread, and guide means at each side of said support and outwardly relatively to which said traction means move when leaving the bread, whereby said guide means serve to strip the bread from said traction means.

4. In a toaster of the class described, a pair of spaced toasting elements, a support on which a slice of bread may rest as it is moved between said pair of toasting elements, traction means for said bread at each side of said support, a motor, cam mechanism driven by said motor for actuating said traction means, said cam mechanism in each cycle thereof moving said traction means toward the bread, then linearly with the bread relatively to said support, and then away from the bread and back to the beginning of the cycle.

5. In a toaster of the class described, a pair of spaced toasting elements, a support on which a slice of bread may rest as it is moved between said pair of toasting elements, traction means for said bread at each side of said support, a motor, cam mechanism driven by said motor for actuating said traction means, said cam mechanism in each cycle thereof moving said traction means toward the bread, then linearly with the bread relatively to said support, and then away from the bread and back to the beginning of the cycle, and guide means at each side of said support and outwardly relatively to which said traction means move when leaving the bread whereby said guide means serve to strip the bread from said traction means.

6. In a toaster of the class described, a pair of spaced toasting elements, a support on which a slice of bread may rest as it is moved between said pair of toasting elements, a pair of plates mounted for sliding movement under said support, traction means secured to each plate and extending upwardly at each side of said support for contacting said bread as it rests on said support, power means, and means whereby said power means moves said plates cyclically relatively to one another to carry said traction means into contact with the bread, then for movement with the bread on the support, and then away from the bread and back to the beginning of the cycle.

7. In a toaster of the class described, a pair of spaced toasting elements, a support on which a slice of bread may rest as it is moved between said pair of toasting elements, a pair of plates mounted for sliding movement relatively to one another under said support, traction means secured to each plate and extending upwardly at each side of said support for contacting the bread as it rests on said support, cam mechanism for actuating said plates cyclically and in opposed relation, said cam mechanism moving said plates to carry said traction means into contact with the bread, then for movement with the bread linearly of the support, and then away from the bread and back to the beginning of the cycle, and power means for actuating said cam mechanism.

8. In a toaster of the class described, a support on which a slice of bread may rest as it is moved between a pair of toasting elements, a pair of plates mounted for sliding movement relatively to one another under said support, traction means secured to each plate and extending upwardly at each side of said support for contacting the bread as it rests on said support, cam mechanism for actuating said plates cyclically and in opposed relation, said cam mechanism moving said plates to carry said traction means into contact with the bread, then for movement with the bread linearly of the support, and then away from the bread to the beginning of the cycle, spring means pressing said plates linearly toward one another and in a direction to bring said traction means against the bread, and a lost motion connection between said cam mechanism and each of said plates whereby when said cam mechanism moves in a direction to bring said traction means against said bread, said cam mechanism moves relatively to said plates because of said lost motion connection when said traction means contact a piece of bread thicker than a predetermined extent.

9. In a toaster of the class described, a support on which a slice of bread may rest as it is moved between a pair of toasting elements, traction means for said bread at each side of said support, a motor, cam mechanism driven by said motor for actuating said traction means, said cam mechanism in each cycle thereof moving said traction means toward the bread, then linearly with the bread relatively to said support, and then away from the bread and back to the beginning of the cycle, spring means pressing said traction means toward one another and toward the bread, and a lost motion connection between said cam mechanism and said traction means whereby when said cam mechanism moves in a direction to bring said traction means against the bread, said cam mechanism moves relatively to said traction means because of said lost motion connection when said traction means encounter bread of greater than predetermined thickness.

10. In a toaster of the class described, a pair of spaced toasting elements, a support on which a slice of bread may rest as it is moved between said pair of toasting elements, traction means for said bread at each side of said support, power means for actuating said traction means cyclically to contact the bread, to move the bread relatively to said support, and then to leave the bread and return to the beginning of the cycle, and yielding means through which said power means moves said traction means during at least a portion of each cycle.

11. In a toaster of the class described, a pair of spaced toasting elements, a support on which a slice of bread may rest as it is moved between said pair of toasting elements, traction means for said bread at each side of said support, power means for actuating said traction means cyclically toward one another and against the bread, then to move the bread linearly of the support and then away from one another to leave the bread, and then back to the beginning of the cycle, and spring means through which the said power means moves said traction means back to the beginning of each cycle.

12. In a toaster of the class described, a pair of spaced toasting elements, a support on which a slice of bread may rest as it is moved between said pair of toasting elements, traction means for said bread at each side of said support, spring means urging said traction means toward one another, and power means for actuating said traction means cyclically away from the bread against the force of said spring means, then linearly of said support, then toward said bread through controlling the movement thereof by said spring means, and then linearly with the bread relatively to said support.

13. In a toaster of the class described, a support on which a slice of bread may rest as it is moved between a pair of toasting elements, traction means for said bread at each side of said support, spring means urging said traction means toward one another, power means for actuating said traction means cyclically away from the bread against the force of said spring means, then linearly of said support, then toward said bread through controlling the movement thereof by said spring means, and then linearly with the bread relatively to said support, and a lost motion connection between said power means and said traction means whereby said power means may overrun said traction means during that part of the cycle that said traction means are moving toward the bread.

14. In a toaster of the class described, a pair of spaced toasting elements, a support on which a slice of bread may rest as it is moved between said pair of toasting elements, traction means for engaging opposite sides of said slice of bread at each side of said support, and power means for actuating said traction means cyclically to contact the bread, to move the bread on said support and then to leave the bread, and means whereby said power means overruns said traction means if more than a predetermined thickness of bread is encountered by said traction means during that part of the cycle that the traction means moves toward the bread.

15. In a toaster of the class described, a pair of spaced toasting elements, a support on which a slice of bread may rest as it is moved between said pair of toasting elements, traction means for said bread at each side of said support, power means, and cycle means between said power means and said traction means for actuating said traction means to engage and disengage the toast once in each cycle and to move the bread on said support during the time it is engaged therewith.

16. In a toaster of the class described, a pair of spaced toasting elements, a support on which a slice of bread may rest as it is moved between said pair of toasting elements, traction means for said bread at each side of said support, power means, power transmission means whereby said power means moves said traction means cyclically to grip the bread and feed it step by step on said support, and means for varying the distance said traction means feed said bread in each cycle.

17. In a toaster of the class described, a pair of spaced toasting elements, a support on which a slice of bread may rest as it is moved between said pair of toasting elements, traction means for said bread at each side of said support, power means, power transmission means whereby said power means moves said traction means cyclically to grip the bread and feed it step by step on said support, spring means included as a part of said power transmission means and through which said traction means are moved during that part of each cycle determining the distance said traction means feed said bread in each cycle, and means for limiting the movement of said traction means by said spring means whereby to control the distance the bread is moved in each cycle.

18. In a toaster of the class described, toasting elements, a pair of supports each adapted to support a slice of toast adjacent said toasting elements, a pair of plates slidable relatively to one another under said supports, a pair of traction members extending from each plate with one traction member of each plate at one side of each support, power means, and cyclic cam mechanism actuated by said power means for first moving said plates to bring said traction members against a slice of bread on each support, then with the bread linearly of said supports, and then away from the bread and back to the beginning of the cycle.

19. In a toaster of the class described, toasting elements, a pair of supports each adapted to support a slice of toast adjacent said toasting elements, a pair of plates slidable relatively to one another under said supports, a pair of traction members extending from each plate with one traction member of each plate at one side of each support, a spring pressing said plates endwise toward one another in a direction to bring said traction members against a slice of bread on each of said supports, cyclic operating power means, and cam mechanism actuated by said power means to control the movement of said plates by said spring to bring the traction members against said bread, then to move the bread linearly of said supports and then away from the bread against the resistance of said spring, and then back to the beginning of the cycle.

20. In a toaster of the class described, toasting elements, a pair of supports each adapted to support a slice of toast adjacent said toasting elements, a pair of plates slidable relatively to one another under said supports, a pair of traction members extending from each plate with one traction member of each plate at one side of each support, a spring pressing said plates endwise toward one another in a direction to bring said traction members against a slice of bread on each of said supports, power means, cyclic cam mechanism actuated by said power means to control the movement of said plates by said spring to bring the traction members against said bread, said cam mechanism moving said plates positively in a feed direction and then positively against said spring to bring the traction means away from the bread, a control plate sliding relatively to said pair of plates, said cam mechanism moving said control plate relatively to said supports, and spring means between said control plate and said pair of plates and through which said control plate moves said pair of plates in a nonfeeding direction under the control of said cam mechanism.

21. In a toaster of the class described, a pair of supports each adapted to support a slice of toast, a pair of plates slidable relatively to one another under said supports, a pair of traction members extending from each plate with one traction member of each plate at one side of each support, a spring pressing said plates endwise toward one another in a direction to bring said traction members against a slice of bread on each of said supports, a control plate sliding relatively to said pair of plates, a pair of rotating cams, power means for rotating said cams, said cams moving said pair of plates cyclically against the force of said spring to bring the traction means away from the bread and controlling the movement of the plates by said spring to carry the traction means toward the bread, said cams moving said pair of plates also to actuate said traction means to move the bread on said supports after said traction means engages the bread, means whereby said pair of rotating cams move said control plate cyclically while moving said pair of plates, and yielding means through which said control plate moves said pair of plates toward a starting position from which to begin each bread moving cycle.

22. In a toaster of the class described, a pair of supports each adapted to support a slice of toast, a pair of plates slidable relatively to one another under said supports, a pair of traction members extending from each plate with one traction member of each plate at one side of each support, a spring pressing said plates endwise toward one another in a direction to bring said traction members against a slice of bread on each of said supports, a control plate sliding relatively to said pair of plates, a pair of rotating cams, power means for rotating said cams, said cams moving said pair of plates cyclically against the force of said spring to bring the traction means away from the bread and controlling the movement of the plates by said spring to carry the traction means toward the bread, said cams moving said pair of plates also to actuate said traction means to move the bread on said supports, means whereby said pair of rotating cams move said control plate cyclically while moving said pair of plates, yielding means through which said control plate moves said pair of plates toward a starting position from which to begin each bread moving cycle, and means for limiting the movement of said plates and their traction means by said yielding means whereby to control the distance the bread is moved in each cycle.

23. In a toaster of the class described, a main plate, a pair of bread traction members extending from below said main plate through openings in said plate and movable in controlled closed paths relatively to said openings, and a thin plate secured to each traction member for movement therewith, said thin plates overlying said main plate for closing said openings in all positions of said traction members.

24. In a toaster of the class described, a main plate, a pair of bread traction members extending from below said main plate through openings in said plate and movable in controlled closed paths relatively to said openings, and a thin plate secured to each traction member for movement therewith, each of said thin plates having an opening also for permitting the movement of the other traction member, said thin plates overlying said main plate and parts of one another, for closing said openings in said main plate and also in said thin plates in all positions of said traction members.

25. In a toaster of the class described, a support on which a slice of bread may rest as it is moved between a pair of toasting elements, a traction member in the form of a relatively rigid longitudinally extending structural member substantially the same length as said support whereby to move on said support two or more slices of bread, an actuator bar mounting said traction member for pivotal movement about an axis positioned perpendicularly to said support, means mounting said actuator bar for movement in repeated short cyclic strokes substantially midway of said support, and means securing said traction member to said actuator bar at a point substantially midway of said traction member.

26. In a toaster of the conveyor type, power means for moving a slice of bread to one end of the toaster, yielding bread holding means at that end of the toaster to which the bread is delivered by said power means, and said bread moving into contact with said yielding bread holding means by said power means to be held by said bread holding means until removed manually, and pivotal means mounting said yielding bread holding means for swinging in one direction as it receives the bread from said power means, and in a reverse direction after the bread is removed therefrom.

FRANK O. KOMPASS.

REFERENCES CITED

The following references are of record in the file of this patent:

UNITED STATES PATENTS

| Number | Name | Date |
|---|---|---|
| 1,708,522 | Pross | Apr. 9, 1929 |
| 1,948,010 | Shippy et al. | Feb. 20, 1934 |
| 2,038,028 | De Matteis | Apr. 21, 1936 |
| 2,042,226 | Harpster | May 26, 1936 |
| 2,085,590 | Jones | June 29, 1937 |
| 2,112,076 | De Matters | Mar. 22, 1938 |
| 2,149,566 | Anderson | Mar. 7, 1939 |
| 2,182,229 | Hamel | Dec. 5, 1939 |
| 2,447,641 | Dunham | Aug. 24, 1948 |
| 2,465,399 | Robinson | Mar. 29, 1949 |
| 2,491,901 | Moohl et al. | Dec. 20, 1949 |